O. G. DALE.
CRUSHING MACHINE.
APPLICATION FILED JULY 14, 1908.

1,100,174.

Patented June 16, 1914.
2 SHEETS—SHEET 1.

Witnesses:
Walter L. Pierce
Robert H. Kammler

Inventor:
Orton G. Dale,
by Emery H. Brock,
Atty.

O. G. DALE.
CRUSHING MACHINE.
APPLICATION FILED JULY 14, 1908.

1,100,174.

Patented June 16, 1914.

2 SHEETS—SHEET 2.

Witnesses:

Inventor:
Orton G. Dale,
by Emery & Booth,
Attys.

UNITED STATES PATENT OFFICE.

ORTON G. DALE, OF PLAINFIELD, NEW JERSEY, ASSIGNOR TO MEAD-MORRISON MANU-
FACTURING COMPANY, OF CAMBRIDGE, MASSACHUSETTS, A CORPORATION OF
MAINE.

CRUSHING-MACHINE.

1,100,174.  Specification of Letters Patent.  Patented June 16, 1914.

Application filed July 14, 1908. Serial No. 443,433.

*To all whom it may concern:*

Be it known that I, ORTON G. DALE, a citizen of the United States, residing at Plainfield, in the county of Union, State of New Jersey, have invented an Improvement in Crushing-Machines, of which the following description, in connection with the accompanying drawings, is a specification, like letters on the drawings representing like parts.

This invention relates to a crushing machine, as for example, a coal crusher; and pertains more particularly to the construction and organization of crushing or breaking instrumentalities.

Among other objects the invention is intended to supply a machine which shall be effective in operation and simple and stable in construction.

The character of the invention may be best understood by reference to the accompanying drawings, which show for purposes of illustration one practicable embodiment of the invention.

Figure 1:
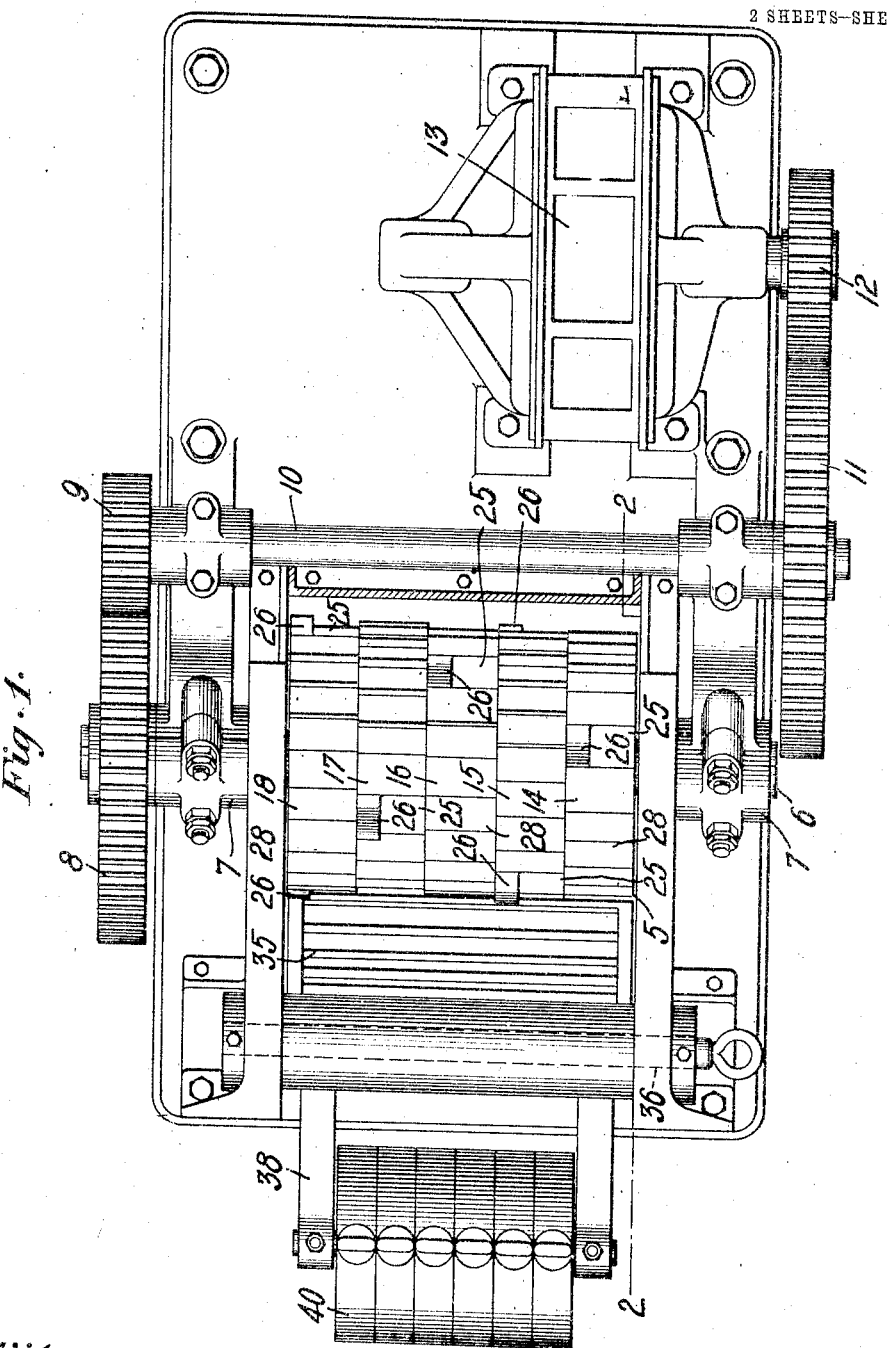
Figure 2:
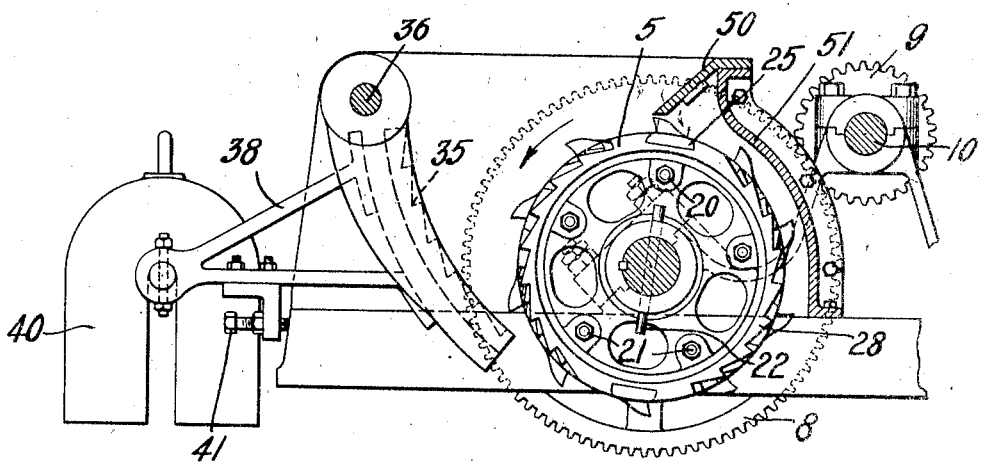
Figure 3:
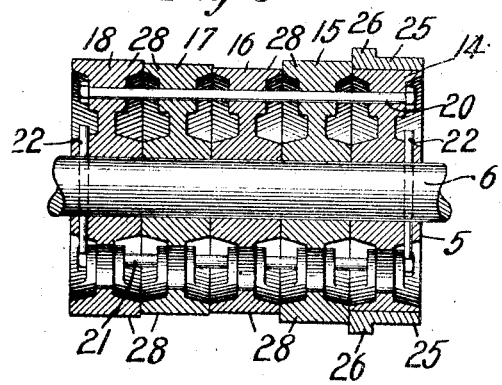

In the drawings,—Figure 1 is a plan view of the illustrative machine; Fig. 2 is a section on the line 2—2 of Fig. 1; and, Fig. 3 is a detached detail section of a crushing drum shown in Fig. 2, on an axial plane of said drum.

Referring to the drawings the specific illustrative machine comprises a crushing drum 5, fixed upon a shaft 6, mounted in bearings 7 and having fixed at one end thereof a gear 8. The latter meshes with a gear 9, mounted upon a countershaft 10, which is driven through a gear 11 by a gear 12. The gear 12 may be mounted upon the shaft of a motor 13 or may be otherwise driven in any practicable manner.

In the preferred operation of the machine the gearing is such that the drum 5 is driven in the direction of the arrow in Fig. 2. The drum 5 preferably comprises a plurality of sections, as shown in Fig. 3, and each section may be provided with teeth or other crushing or breaking instrumentalities upon its periphery. The drum sections 14, 15, 16, 17 and 18 may be mounted side by side and contact laterally, upon the shaft 6, and they may be secured together so as to constitute substantially a unit by means of the bolts 20, 21. One or more of the drum sections may be fixed to the shaft 6 by a pin 22. In providing a drum of the character described with teeth or the like, it is preferred that the latter be hard and of superior material, so as to withstand the destructive wear to which they are ordinarily subjected; and it is impracticable to use in the body of the drum the high grade of material desired for the teeth. Accordingly, it is expedient to supply teeth separate from the material of the drum. When this is done it is preferable that the teeth be secured strongly in place, so that while separate from the drum and of different material, they shall be nevertheless in effect substantially rigid adjuncts thereto.

This invention contemplates an especially advantageous construction of tooth and provision for securing the same to the drum.

Referring now to Figs. 2 and 3, each tooth may be made of manganese steel and may be formed with a base 25, which may extend across the periphery of a drum section and may dovetail into the latter, as shown in Fig. 2. Preferably, the top of the tooth base 25 is flush with the periphery of the drum section. Projecting from the base 25 is the crushing member 26 of the tooth. With the described arrangement the tooth has positive engagement with the body of the drum section throughout the transverse extent of the latter; and the severe strains exerted upon the crushing member 26 of the tooth are transmitted to and distributed along this extensive engagement between the tooth and drum.

Any practicable number of teeth assembled with the drum as described, may be employed; and in addition thereto other teeth or crushing devices 28, may be formed in the material of the drum sections themselves. Preferably the teeth 28 are of less dimensions, than the teeth 26, so that the former, while proper to perform a grinding or auxiliary crushing office, will be assisted in or relieved from the heavier crushing work by the larger and stronger teeth 26.

Preferably each of the drum sections 14, 15, etc., has a plurality of each kind of tooth 26 and 28; and they may have the staggered or spiral relation illustrated in Fig. 1; as by having a tooth 26 on the drum section 15 positioned 36 degrees more or less in advance of the tooth 26 on the drum 14, the auxiliary teeth 28 being in similar staggered relation on the drum sections. When so arranged the teeth on the respective drum sections may be disposed in a spiral around the periphery of the drum as a whole, so as to have collectively a sort of spiral stirring action contributory to the grinding or crushing operation. The same may be true of the auxiliary teeth 28, 28.

The teeth 26 may be assembled with the individual drum sections in any practicable manner; but preferably this is accomplished as follows. The drum sections may be secured together side by side and a dovetailed or other tooth receiving groove milled in the periphery of the drum from end to end. Thus, by a single operation each drum section may be provided with a tooth seat. Any number of such milling operations may be employed to provide the desired number of tooth seats; and the teeth may be assembled therewith. If then it be desired to give the teeth a staggered relation, the drum sections may be rotated relatively one to another and secured in any desired relation. In the specific illustrative construction it is convenient to secure the drum sections together by the bolts 20 passing from end to end through the spokes of the drum sections. There may be any practicable number of these tie bolts, for instance, there may be five, as shown in the drawings, and with this arrangement, if desired the teeth may be readily staggered by rotating each drum section through one-fifth of a revolution beyond its neighboring section on one side, and when so adjusted the bolt holes of the different sections will register to receive the tie bolts.

In coöperation with such a crushing drum as has been described, a baffle plate 35 may be provided. The latter may be movable in relation to the drum, as by being pivoted on a shaft 36. A stirrup bracket 38 may be mounted on the baffle plate frame, the same supporting a weight 40 tending to rock the baffle plate contra clockwise in Fig. 2, and hold it normally in the position determined by an adjustable stop screw 41 mounted upon the stirrup bracket 38 and arranged to abut against a part of the frame casting of the machine. The baffle plate may be provided with teeth of any practicable form, preferably opposed to the teeth of the drum. Preferably the acting surfaces of the drum and the baffle plate 35 converge toward the point of discharge of the material from the grinding action and as the material approaches this point of discharge it may be subjected to the conjoint action of both sets of teeth on the drum and at the same time to the opposing action of the teeth on the baffle plate. The conjoint grinding or crushing of the teeth may thus cause initially the breaking up of larger pieces of material, and thereafter a more or less gradual reduction in the sizes of the individual lumps or pieces until having reached their minimum desired size, they are discharged. As described the crushing members 26 of the larger teeth contribute advantageously to the breaking up of the material as well as the later grinding; and the preferably smaller teeth 28 are well adapted to complete the grinding to desired size.

The yielding character of the baffle plate, provided in the specific illustration by its pivotal weighted support, permits a relative yielding between the opposed crushing instrumentalities whenever the material becomes jammed therebetween or when any unbreakable mass is interposed between them. This is especially advantageous in connection with the crushing members 26 of the larger teeth, in that the latter though well adapted for heavy crushing work, are preserved against undue strains by the fact that their impacting against any unbreakable or abnormally hard substance may result in a mere yielding of the baffle plate and discharge of the objectionable material without injury to the teeth.

The framework of the machine may provide a species of chute 50 (Fig. 2; shown in horizontal section in Fig. 1) which preferably inclines in the general direction of the feed of material through the machine thereby, if desired, supplying in conjunction with the opposed crushing instrumentalities a species of hopper. The jacket 51 may more or less inclose the drum.

In the operation of the machine, the material may be fed over the chute 50 or in any other practicable manner into the receiving space between the drum and baffle plate. The drum being rotated preferably contra-clockwise in Fig. 2, the material is initially broken up, and through the course of operation is crushed to any desired fineness, the adjustable stop 41 permitting any desired relation between the baffle plate and drum to be determined, whereby the degree of fineness of the ground material may be varied.

The foregoing will suffice to explain the general character of the invention. It is to be understood that the invention is by no means limited to the specific details of organization and construction hereinbefore set forth for illustration; since as will appear to those skilled in the art the invention may be variously embodied. It is not indispensable that all features of the invention be used conjointly, since they may be employed separately to advantage.

Claims.

1. A machine of the character described comprising, in combination, a crushing drum comprising a plurality of sections secured together; individual teeth of different material from that of the drum, removably dovetailed in the periphery of each said section, each said tooth having an extended engagement with its section throughout the width of the periphery of the section and having a relatively narrow crushing member integral with said base, each of the said drum sections having also integral smaller teeth thereon, the teeth on the respective sections being in staggered relation; an adjustable yielding baffle plate having teeth opposing those on the drum, the co-acting portions of the baffle plate and drum supplying a species of converging hopper to receive the material to be acted upon.

2. A machine of the character described comprising, in combination, a crushing drum comprising a plurality of sections secured together; relatively large crushing or breaking teeth on the drum sections and of different material therefrom; a plurality of relatively small auxiliary grinding teeth interposed between two large teeth on the drum sections; an opposing baffle plate to coöperate with the drum and yielding means permitting relative change of position of said crushing drum and said baffle plate.

3. A machine of the character described comprising, in combination, a plurality of drum sections secured together; a base member separable from and rigidly mounted on each of said drum sections and having extended engagement therewith; a crushing member on said base member, the crushing members on the respective drum sections being in staggered relation; and yielding means coöperating with the drum and said staggered teeth to perform a crushing operation.

4. A machine of the character described comprising, in combination, a plurality of drum sections secured together, a base member separable from and rigidly mounted on each said drum section and having extended engagement therewith and abutting against an adjacent drum section; a crushing member on said base member, the crushing members on the respective drum sections being in staggered relation; and yielding means coöperating with the drum and said staggered teeth to perform a crushing operation.

5. A machine of the character described comprising, in combination, a plurality of coaxially disposed drum sections provided with staggered longitudinal grooves, crushing members held in said grooves in staggered relation, said sections having alined apertures, a rod extending through said apertures, and means coöperating with the drum and said members to perform a crushing operation.

6. A machine of the character described comprising, in combination, a drum having a plurality of drum-sections provided with grooves, teeth held in the grooves of the several sections in staggered relation with one another, and means coöperating with said drum to perform a crushing operation.

7. A machine of the character described comprising, in combination, a plurality of coaxially disposed drum sections each provided with a plurality of relatively large teeth, and a plurality of relatively small teeth disposed between two of the relatively large teeth, the large teeth of the several sections being disposed in staggered relation with one another, and means coöperating with said drum to perform a crushing operation.

8. A machine of the character described comprising, in combination, a plurality of coaxially disposed drum sections each provided with a plurality of relatively large teeth, and a plurality of relatively small teeth disposed between two of the relatively large teeth, the large teeth of the several sections being disposed in staggered relation with one another, and the small teeth of the several sections being disposed in staggered relation with one another, and means coöperating with said drum to perform a crushing operation.

9. A machine of the character described comprising, in combination, a plurality of coaxially disposed drum sections each provided with one or more longitudinal grooves in its periphery, the grooves of the several drum sections being in staggered relation to one another, tooth members having bases held in said grooves, respectively, and abutting against the ends of the adjacent sections, and means to secure said drum sections together and maintain said grooves in said staggered relation.

10. A machine of the character described comprising, in combination, a plurality of coaxially arranged drum sections each provided with a plurality of series of integral teeth and one or more longitudinal grooves between said series of teeth, the grooves and teeth of the several drum sections being arranged in staggered relation to one another, tooth members having bases held in said grooves, respectively, and abutting against the ends of the adjacent sections, and means to secure said drum sections together to maintain said grooves in staggered relation.

11. A machine of the character described comprising, in combination, a plurality of coaxially disposed drum sections each provided with one or more longitudinal grooves in its periphery and a plurality of apertures, said grooves being arranged in staggered relation to one another and said apertures registering with one another, tooth members having bases held in said grooves, respectively, and abutting against the ends of the adjacent sections, and a member extending through said apertures to hold said grooves in such staggered relation.

In testimony whereof, I have signed my name to this specification, in the presence of two subscribing witnesses.

ORTON G. DALE.

Witnesses:
 FLORENCE J. WALSH,
 L. HARRY ROSE.